(12) United States Patent
Donovan et al.

(10) Patent No.: US 10,564,629 B2
(45) Date of Patent: Feb. 18, 2020

(54) GENERATING HALFTONE DATA FOR A THREE-DIMENSIONAL OBJECT

(71) Applicant: HEWLETT-PACKARD DEVELOPMENT COMPANY, L.P., Houston, TX (US)

(72) Inventors: David H. Donovan, San Diego, CA (US); Jacob Tyler Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 71 days.

(21) Appl. No.: 15/511,906

(22) PCT Filed: Oct. 8, 2014

(86) PCT No.: PCT/US2014/059674
§ 371 (c)(1),
(2) Date: Mar. 16, 2017

(87) PCT Pub. No.: WO2016/057029
PCT Pub. Date: Apr. 14, 2016

(65) Prior Publication Data
US 2017/0246811 A1    Aug. 31, 2017

(51) Int. Cl.
```
G06T 15/00      (2011.01)
G05B 19/4099    (2006.01)
H04N 1/405      (2006.01)
B33Y 50/02      (2015.01)
B29C 64/386     (2017.01)
```
(52) U.S. Cl.
CPC ........ *G05B 19/4099* (2013.01); *B29C 64/386* (2017.08); *B33Y 50/02* (2014.12); *H04N 1/405* (2013.01); *G05B 2219/49023* (2013.01)

(58) Field of Classification Search
CPC ...... H04N 1/405; B33Y 50/02; B29C 64/386; G05B 2219/49023; G05B 19/4099
USPC .......................................................... 345/419
See application file for complete search history.

(56) References Cited

U.S. PATENT DOCUMENTS

| | | |
|---|---|---|
| 6,007,318 A | 12/1999 | Russell et al. |
| 7,321,447 B2 | 1/2008 | Kuiper |
| 7,589,868 B2 | 9/2009 | Velde et al. |
| 9,286,554 B1 * | 3/2016 | Maltz ................. G06K 15/1881 |
| 9,794,444 B2 * | 10/2017 | Morovic ............ H04N 1/32309 |
| 2004/0080078 A1 | 4/2004 | Collins |

(Continued)

FOREIGN PATENT DOCUMENTS

EP    0 583 776    *    8/1993

OTHER PUBLICATIONS

Gooran S. Digital halftoning. Department of Science and Technology, Linkoping University, Campus Norrköping, Sweden, webstaff. itn. liu. se/~ sasgo26/TNM011/digital_ halftoning. doc, accessed online. 2005.*

(Continued)

*Primary Examiner* — Phu K Nguyen

(57) ABSTRACT

A method of forming a three-dimensional object includes non-deterministically generating halftone data for portions of a slice of three-dimensional model data of the three-dimensional object that overlap with a previous slice. The non-deterministically generating halftone data may comprise using randomized initialization for each slice of a three-dimensional object.

15 Claims, 7 Drawing Sheets

(56) References Cited

U.S. PATENT DOCUMENTS

2005/0072113 A1    4/2005  Collins
2008/0180475 A1    7/2008  Eldar
2010/0262272 A1   10/2010  Shkolnik
2011/0249298 A1   10/2011  Gullentops et al.
2012/0156516 A1    6/2012  Takeshi
2013/0292862 A1   11/2013  Joyce

OTHER PUBLICATIONS

Emanuel Sachs et al.; "Numerical Simulation of Deposition Process for a New 3DP Printhead Design"; Journal of Materials Processing Technology; vol. 161, Issue 3, Apr. 30, 2005; pp. 509-515.
Dr. Wonjoon Cho; Halftoning for 3DP; Apr. 1, 2002; MIT Confidential.
W. Cho et al; "Methods for Distributed Design and Fabrication of Parts with Local Composition Control"; NSF Design and Manufacturing Grantees Conference; Jan. 2001.
Cho et al; "A Dithering Algorithm for Local Composition Control with Three-Dimensional Printing"; Aug. 1, 2003; Computer Aided Design; vol. 35, No. 9, pp. 851-867.
Lou; "Fundamentals of 3D Halftoning"; ECCV 2016 Conference; Jan. 1, 1998; vol. 1375, pp. 224-239.

\* cited by examiner

GENERATING HALFTONE DATA FOR A THREE-DIMENSIONAL OBJECT

BACKGROUND

Additive manufacturing systems allow for the formation of three dimensional objects from a build material and electronic data defining a three-dimensional model of the object.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
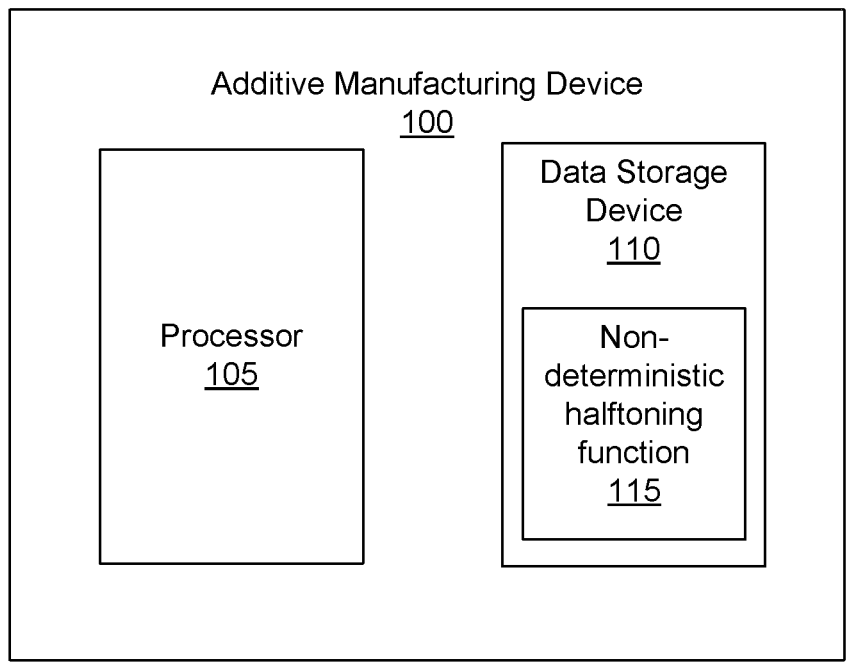
FIG. 1 is a block diagram of an additive manufacturing device according to one example of the principles described herein.

In additive manufacturing systems, a desired object is fabricated according to the electronic data of a three-dimensional model. Prior to formation, the object is logically divided into slices. Data defining each layer of the object is taken from a cross-sectional slice of the three-dimensional model. The data for each slice is converted into a pattern that will be used by the additive manufacturing system to form the corresponding layer of the object.

As discussed in the following description, the pattern produced from the data for any particular layer of the object may be the result of a deterministic halftoning of the data slice for that layer. Halftoning is a technique used in two-dimensional printing to reproduce a continuous tone image on a printer capable of printing only a small number of tone levels. Halftoning involves placing a number of dots on a media, varying the position, shape, size, and/or color of the dots so as to blend the dots such that the human eye cannot detect the individual dots from a sufficient distance, but instead sees an image that closely resembles the original contone (i.e., continuous tone) image. With additive manufacturing systems, the same concept may apply. In three dimensions, halftoning is a technique that transforms a model of an object having areas of continuous density into a binary representation of that continuous or contone data so that the modeled object can be rendered by a variety of additive manufacturing techniques. The difference between traditional two-dimensional halftoning of a printed image and three-dimensional halftoning is that halftone data for printing dictates binary dot patterns on the surface of a print medium, while three-dimensional halftoning provides particle patterns arranged in space. Thus, the halftone data becomes a map or pattern that tells the additive manufacturing system where build material should be solidified to form a current layer of the object. Thus, in practice in different additive manufacturing systems, the halftone data will indicate where a coalescing or other chemical agent should be deposited in a powdered build material, where a build material should be deposited in a system that only places build material where it is needed or points where energy such as a laser should be applied to solidify build material. However, the dots in two-dimensional printing correspond to actions taken to form a physical layer of the object, for example, a point of deposition of a build material, application of energy to build material, deposition of chemical reactant into a build material, and others.

The present specification describes a method of forming a three-dimensional object that includes non-deterministically generating halftone data for portions of a slice of three-dimensional model data of the three-dimensional object that overlap with a previous slice. As used in the present specification and in the appended claims, the term "overlap" when describing successive slices of a three-dimensional object means two or more slices of data in the three-dimensional model that comprise at least some two-dimensional geometry in common. As will be explained below, if two successive slices partially overlap each other, the present specification applies non-deterministic halftoning to those portions of a slice that overlap the preceding slice, but not necessarily to those portions which do not.

An additive manufacturing device includes a processor; and a memory communicatively coupled to the processor. The processor non-deterministically generates halftone data for each of a number of successive slices of three-dimensional model data for a three-dimensional object if at least a portion of each of the successive slices overlap with a previous slice.

As will be explained below, halftoning may be performed either deterministically or non-deterministically. For portions of the current slice that overlap with a previous slice, the halftoning is performed non-deterministically.

Further, the present specification describes another method that includes, with a processor of an additive manufacturing system, determining whether at least a portion of a first slice of three-dimensional object model data overlaps at least a portion of a successive slice; and non-deterministically generating halftone data for a portion of the successive slice of three-dimensional model data defining the three-dimensional object if the first slice overlaps the successive slice.

As used in the present specification and in the appended claims, the term "non-deterministic" refers to an operation that does not necessarily produce the same result if given the same input. In other words, non-deterministic refers to producing any quality or state that is not identical after an operation has been performed despite the same qualities or states being initially present. Conversely, "deterministic" refers to an operation that, given the same input, will always produce the same result.

As used in the present specification and in the appended claims, the term "slice" means a set of model data for a planar cross-section of a three-dimensional object represented electronically by a three-dimensional model from which the "slice" is taken.

As used in the present specification and in the appended claims, the term "layer" means a planar cross-section of a physical, three-dimensional object. In additive manufacturing, a layer of the three-dimensional object corresponds to a slice of the three-dimensional model data.

As used in the present specification and in the appended claims, the term "coalesce" means to solidify or fuse into a solid mass a build material that was formerly loose or fluid.

In the present specification and in the appended claims, the term "build material" means a loose or fluid material, for example, a powder, from which a desired three-dimensional object is formed in additive manufacturing.

As used in the present specification and in the appended claims, the term "coalescing agent" means any substance that causes a build material to coalesce. In one example, the coalescing agent may be any substance that absorbs radiant energy, causing the coalescing agent to heat, which then heats a build material sufficiently so that the build material coalesces when energy is temporarily applied thereto.

As described herein, a non-deterministic halftoned layer of a three-dimensional object is different from other layers of the three-dimensional object despite the original contone data defining the layers being identical. Thus, the techniques described may produce different halftone patterns throughout vertically consistent portions of the three-dimensional object. In other words, successive layers of three-dimensional object, having the same two-dimensional geometry, will not have the same halftoning pattern as each other. Consequently, "non-determinism" applies in this context when comparing layers within an object. By using non-deterministic halftoning, slices having at least a portion of overlapping two-dimensional geometry, that may have an inherent flaw, do not repeat that flaw in each layer to produce a defective object.

As used in the present specification and in the appended claims, the term "additive manufacturing system" or "additive manufacturing device" means any device that fabricates a three-dimensional object from a build material using slices of model data to form corresponding layers of the object. In one example, the additive manufacturing system includes an additive manufacturing device. In another example, the additive manufacturing system comprises a selective laser melting (SLM) system, a direct metal laser sintering (DMLS) system, a selective laser sintering (SLS) system, a stereolithography (SLA), and a laminated object manufacturing (LOM). In one example, an additive manufacturing system comprises any fabrication device that implements an additive process that forms a three-dimensional object. Some of these systems may be referred to a three-dimensional printers.

As used in the present specification and in the appended claims, the term "a number of" or similar language is meant to be understood broadly as any positive number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning to FIG. 1, a block diagram of an additive manufacturing device (100) according to one example of the principles described herein is shown. The device (100) may comprise a processor (105) and a data storage device (110). As will be described in more detail below, the device (100) non-deterministically generates halftone data via the processor (105) for portions of each of a number of successive slices of a three-dimensional object that overlaps a previous slice.

The data storage device (110) may store data such as executable program code that is executed by the processor (105) or other processing device. As will be discussed, the data storage device (110) may specifically store computer code representing a number of applications that the processor (105) executes to implement at least the functionality described herein. The data storage (110) device may also store some or all of the electronic three-dimensional model data for an object that is to be generated. The data storage device (110) also stores a non-deterministic halftoning function (115) for non-deterministically converting slices of the model into halftone patterns for use by the device (100) in forming corresponding layers of the modeled object. As described herein, the non-deterministic halftoning methods described herein reduce the aggregation of minor errors that might exist in the data and that might become significant in production of the modeled object.

The data storage device (110) may include various types of memory, including volatile and nonvolatile memory. For example, the data storage device (110) of the present example includes Random Access Memory (RAM), Read Only Memory (ROM), and Hard Disk Drive (HDD) memory. Other types of memory may also be utilized, and the present specification contemplates the use of varying type(s) of memory in the data storage device (110) as may suit a particular application of the principles described herein. In certain examples, different types of memory in the data storage device (110) may be used for different data storage needs. For example, in certain examples the processor (105) may boot from Read Only Memory (ROM), maintain nonvolatile storage in the Hard Disk Drive (HDD) memory, and execute program code stored in Random Access Memory (RAM).

The processor (105) may include the hardware architecture to retrieve executable code from the data storage device (110) and execute the executable code. The executable code of the function (115), when executed by the processor (105), causes the processor (105) to non-deterministically generate halftone data for portions of each of a number of successive slices of a three-dimensional object according to some examples of the methods of the present specification described herein. In the course of executing code, the processor (105) may receive input from and provide output to a number of the remaining hardware units.

The device (100) may be any additive manufacturing device capable of generating a three-dimensional object. In one example, a deposited build material may be selectively solidified or coalesced with the additive manufacturing device (100) to form portions of the three-dimensional object to be formed. In this example, a coalescing agent may be deposited onto a build material such as a ceramic powder such that application of radiation energy to the coalescing agent provides heat to the build material causing the build material to coalesce. In this example, the coalescing agent may be deposited onto a substrate via a depositor. In another example, the device (100) may deposit layers of material such that the layering of the material forms the three-dimensional object. In this example, the material is deposited onto a substrate via an extruder.

Figure 2:
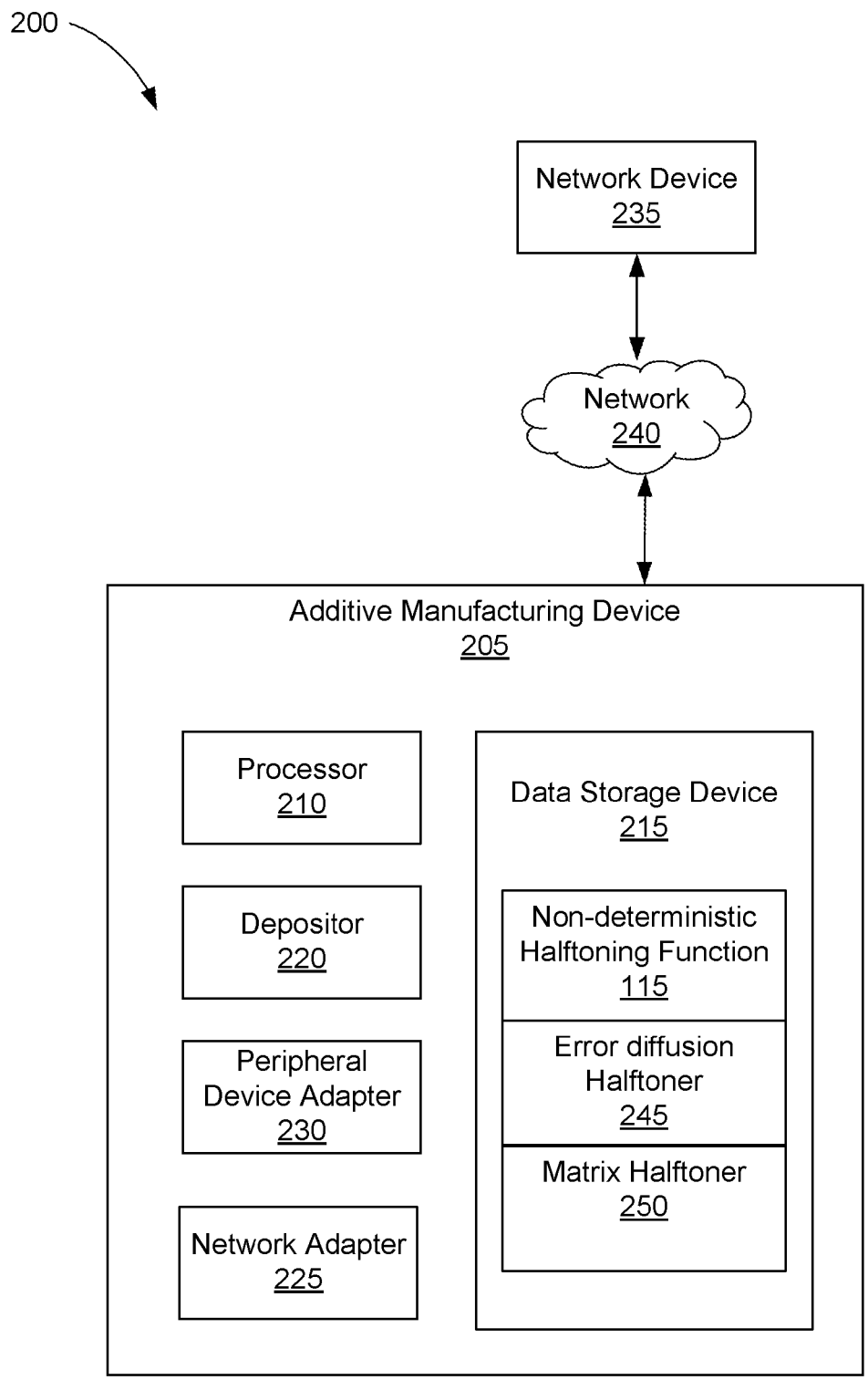
FIG. 2 is a block diagram of an additive manufacturing system according to one example of the principles described herein.

FIG. 2 is a block diagram of an additive manufacturing system (200) according to one example of the principles described herein. The system (200) may comprise an additive manufacturing device (205), and a network device (235). In one example, the network device (235) may be communicatively coupled to the additive manufacturing device (205) via a network (240). The network device (235), in one example, may be any computing device that provides data to the additive manufacturing device (205) in order to generate a three-dimensional copy representing that data. In one example, the network is an intranet, an internet, or the Internet. Once the data is received, the additive manufacturing device (205), via the processor (210), executes the executable code (115) described above and herein to cause the processor (105) to implement at least the functionality of non-deterministically generating halftone data for portions of a slice that overlap with a previous slice.

In this example, the additive manufacturing device (205) may also comprise a data storage device (215). Similar to the data storage device (FIG. 1, 110) described above, the data storage device (215) in this system (200) may store data such as executable program code (115) that is executed by the processor (210) or other processing device. Again, the data storage device (215) may specifically store computer code representing a number of applications that the processor (210) executes to implement at least the functionality described herein, for example an error-diffusion halftoner (240), which will be described further below. The data storage device (215) may also have similar characteristics as described above in connection with the data storage device (FIG. 1, 110) of the additive manufacturing device (FIG. 1, 100).

The hardware adapters (225, 230) in the additive manufacturing device (200) enable the processor (210) to interface with various other hardware elements, external and internal to the additive manufacturing device (205). For example, the peripheral device adapters (230) may provide an interface to input/output devices, such as, for example, a display device, a mouse, or a keyboard. The peripheral device adapters (230) may also provide access to other external devices such as an external storage device, a number of network devices such as, for example, servers, switches, and routers, client devices, other types of computing devices, and combinations thereof.

The depositor (220) may be any device capable of depositing a fluid or solid onto a surface. As noted above, in some instances, the depositor (220) may selectively deposit build material to form a layer of the target object. In other examples the depositor (220) may selectively deposit a binder or congealing agent into a loose build material to form a layer of the target object.

In examples where a fluid agent is deposited, the depositor (220) may be a piezoelectric printhead or a thermal printhead. In one example, the fluid deposited may be a coalescing agent with this coalescing agent being deposited onto a medium such as a powder build material. The coalescing agent may be deposited onto the build material as drops in a pattern dictated by the halftoning data generated by the processor (210) as described in more detail below. The coalescing agent may receive energy from an energy source such as a microwave source, infrared source, or visible radiation source that is applied generally to the build material and coalescing agent. The coalescing agent then absorbs that energy thereby causing the build material surrounding the coalescing agent to coalesce and then solidify as it is cooled thereby creating a layer of the target object.

In other examples, the depositor (220) may deposit, according to received halftoning data, any type of fluid that may harden or cure over time thereby creating a layer of the target three-dimensional object. In a further example, the depositor (220) may, according to received halftone data, deposit a binding material onto a building material that glues together that build material. In one example, the build material may be, without limitation, a ceramic powder, a metal, a plastic, an inorganic material, or a composite material such as a fiber reinforced plastic, a polymer infused ceramic.

The depositor (220) may be configured as a scanning depositor or may be arranged in a page-wide array configuration. In a scanning depositor, the depositor (220) may be allowed to scan relative to the surface of a medium or surface onto which it is depositing material. In one example, the depositor (220) is allowed to move along an x- and y-axial plane. In this example, the depositor (220) may be allowed to scan in the x-axis and is indexed in the y-axis after each scan until the entire surface of the fabrication area has been covered. In a page-wide array configuration, multiple depositors (220) or sets of depositors (220) may act as a single depositor (220) to span, in at least one dimension, an area as large or larger than the fabrication area. In this example, a single scan may cover the entire fabrication area thereby increasing the speed at which the three-dimensional object is generated. In the case of a page-wide array, the surface onto which the material is deposited may move respective to the page-wide array. As such, the present specification contemplates the use of any type of depositor being used to selectively deposit a material in order to generate a three-dimensional object.

The network adapter (240) may provide an interface to other computing devices within, for example, the network (240) as mentioned above. The may enable the transmission of data between the additive manufacturing device (205) and other devices located within the network.

Figure 3:
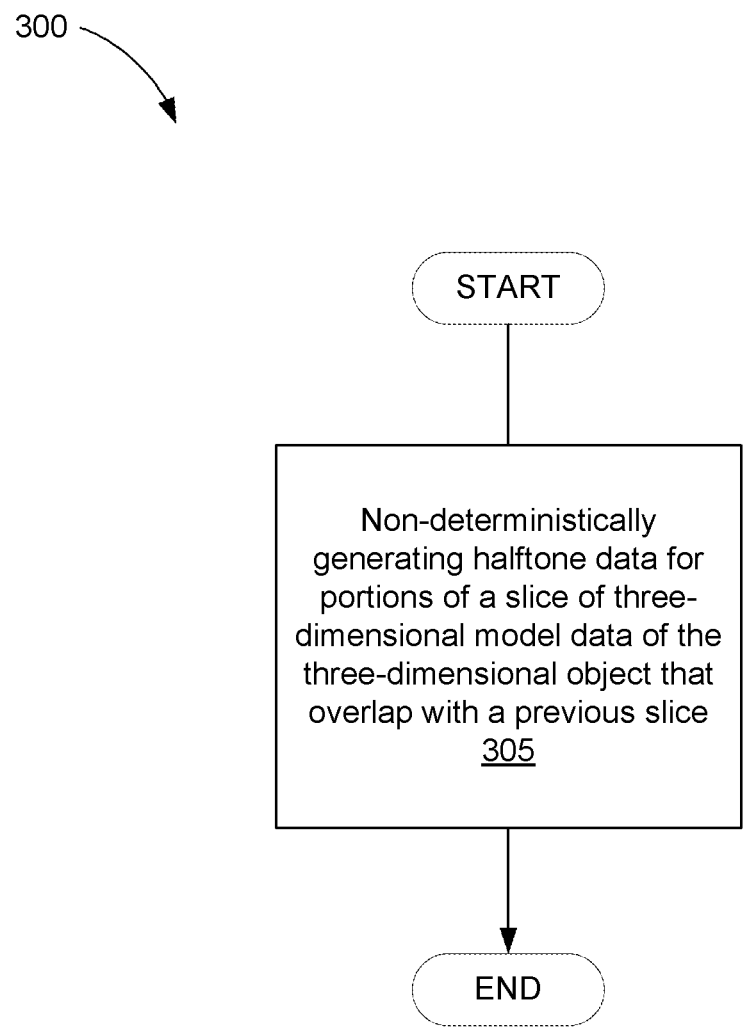
FIG. 3 is a flowchart showing a method of generating a three-dimensional object according to one example of the principles described herein.

As described above, the additive manufacturing device (FIG. 1, 100) and additive manufacturing system (FIG. 2, 200) may implement a method of halftoning during the fabrication of a three-dimensional object. FIG. 3 is a flowchart showing a method (300) of generating a three-dimensional object according to one example of the principles described herein. The method (300) may begin with non-deterministically generating (305) halftone data for portions of a slice of three-dimensional model data of the three-dimensional object that overlap with a previous slice. As will be discussed in more detail below, this process may comprise, in one example, providing a random initialization position by shifting a start position of the halftone matrix for each successive layer of the three-dimensional object. In this example, where a small halftoning matrix is to be tiled, the method may shift the start position by a distance that is not an integral multiple of the matrix size. This may be done so as to help prevent the same start location even when any two successive slices comprise portions that overlap.

In another example, where an error diffusion halftoner is used (FIG. 2, 240), a random error or errors may be preloaded into the error diffusion halftoner before each layer is halftoned such that the pattern resulting from the halftone process will be unique for each layer, even when the input geometrical data is the same. In yet another example, an error array based on the pattern for a given layer may be added to the geometrical data for the next successive layer of the three-dimensional object. In this example, either a matrix halftoner (250) or an error diffusion halftoner (245) may be used. In still another example, an array of random errors may be generated with each error being added to the geometrical data for the next successive layer of the three-dimensional object.

In still another example, a plurality of halftone matrices may be constructed. In this example, a set of complementary halftone matrices can be generated such that one of the constraints used to generate these halftone matrices results in each individual matrix having unique and distinct threshold values at each corresponding X-Y location in the matrix. When these matrices are used sequentially to halftone successive layers of geometrical data, they will produce unique halftone patterns from the same contone data. A collection of a number of matrices used in sequential repetition may be used to reduce the repetition of defects to a level where they have a negligible impact on the fabricated object's properties and surface characteristics. In one example, the number of halftone matrices constructed is between 2 and 10. In another example, the number of halftone matrices constructed is two or more. In another example, the number of halftone matrices constructed is 5 or more.

Implementing one of the above methods provides for a number of advantages. In one example, a repeating pattern comprising an error or flaw is prevented from aggregating those errors into a localized section of the three-dimensional object. In some examples, generation of the halftone patterns described above and herein generates more consistent spacing between drops of fluid deposited by the depositor (220) thereby improving the homogeneity of the three-dimensional object being constructed.

Figure 4:
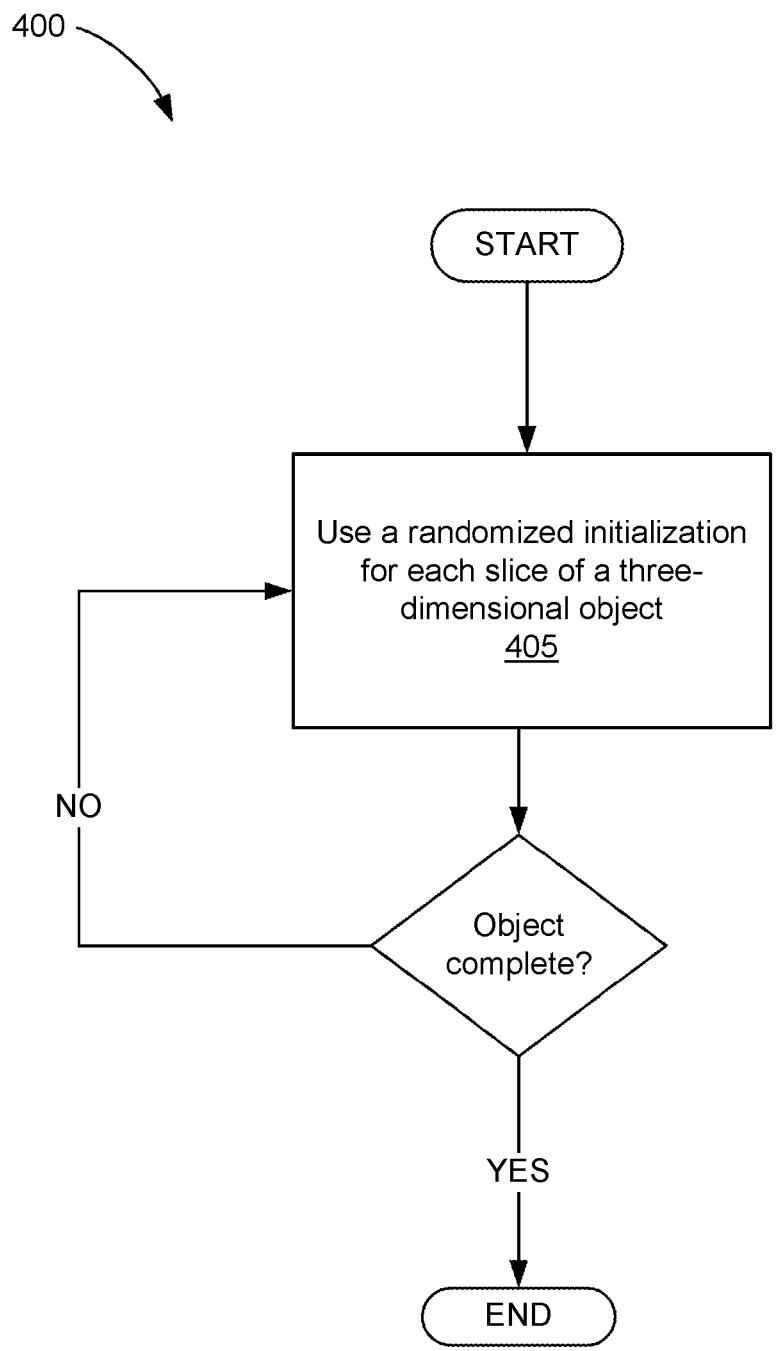
FIG. 4 is a flowchart showing a method of non-deterministically generating halftone data for successive slices of the three-dimensional object according to one example of the principles described herein.

FIG. 4 is a flowchart showing a method (400) of non-deterministically generating halftone data for successive slices of the three-dimensional object according to one example of the principles described herein. The method (400) may begin with using (405) a randomized initialization for each slice of three dimensional model data. In this context, "randomized" refers to both truly random and pseudo random start positions. Where a matrix halftoner (FIG. 2, 250) is used to generate the halftone data used by the additive manufacturing device (FIG. 1, 100), the start position of the matrix can be shifted or translated each time overlapping data is used to generate a layer of the three-dimensional object. In this case, the contone values are each compared to an x-y array of threshold values and the array may be tiled in a step and repeat fashion if it is smaller than the dimensions of the fabrication area. Here, where any value exceeds a threshold value, the additive manufacturing device (FIG. 1, 100) deposits a drop of fluid or build material. Without shifting the matrix for each successive layer being generated, errors in the matrix halftoning data would be repeated at the same location. In another example, this randomized initialization process may be done regardless of the overlap of any number of successive slices of the three-dimensional object. The method (400) of FIG. 4, therefore, prevents repetition of an error in the halftone data along the same or similar z-axis from occurring by changing the start position of each slice of a three dimensional object each time the matrix data defining those slices are used.

Where an error diffusion halftoning process is used to generate the halftone data used by the additive manufacturing device (FIG. 1, 100), a different random error may be preloaded into the halftoning algorithm prior to halftoning each layer. In this case, each time a new layer is generated, a different set of random numbers or seed value may be used to initialize the error terms the halftoner uses to pass errors from element to element. In one example, where a seed value is used, a different seed value for each slice may be generated. In this example, the each seed value may be used to randomly populate a one-dimensional array that carries an error or errors from slice to slice.

Figure 5:
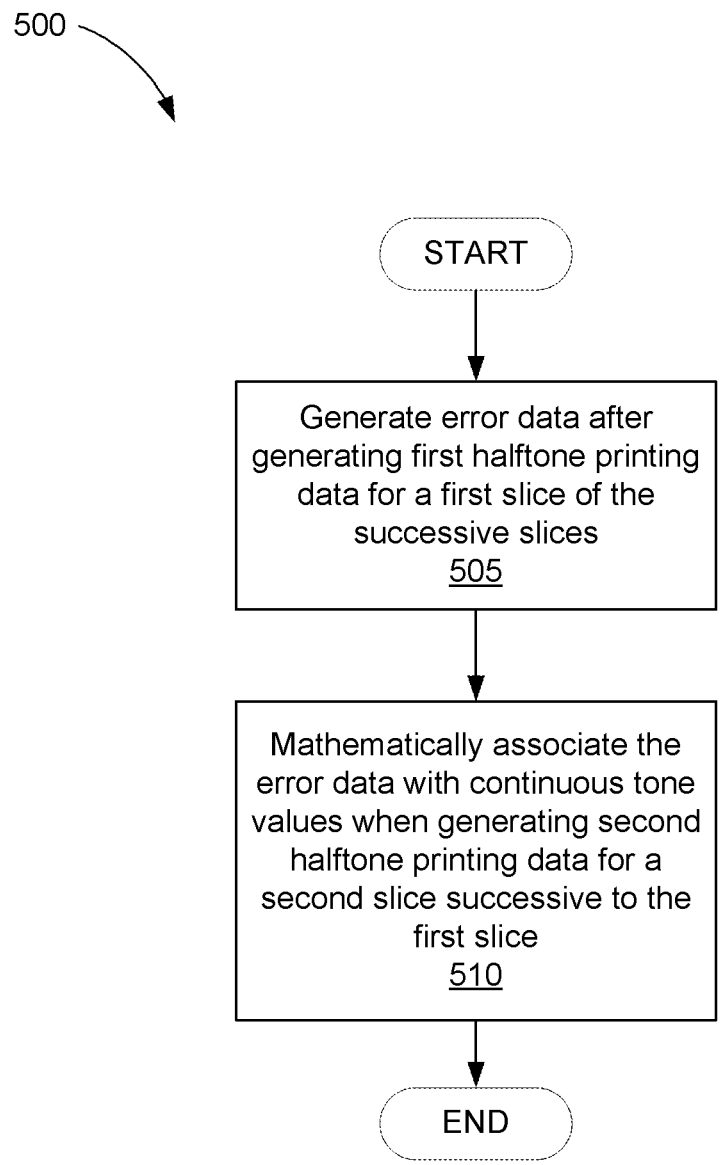
FIG. 5 is a flowchart showing a method of non-deterministically generating halftone data for successive slices of the three-dimensional object according to another example of the principles described herein.

FIG. 5 is a flowchart showing a method (500) of non-deterministically generating halftone data for successive slices of the three-dimensional object according to another example of the principles described herein. The method (500) may begin with generating (505) error data after generating first halftone data for a first slice of the object. In one example, the error data is based on the pattern of the halftone data for any immediately previous slice. In another example, the error data is based on the pattern of the halftone data for any previous slice. In these examples, a negative value may be placed in locations where the halftone pattern indicates a drop of fluid should be deposited. In surrounding areas that do not have any deposited agent or build material, positive values are assigned so that the net sum of the error data is zero.

In one example, the error data may be a scalar value. In this example, the scalar value is added to the contone data of an immediately successive layer. In this example, the sum of the contone data with the scalar value is completed before generating the halftone data for the second slice successive to the first slice. Specifically, the method (500) may continue with mathematically associating (510) the error data with continuous tone values when generating second halftone data for a second slice above the first slice. The addition of the error terms from the preceding layer will result in the halftone process creating a different deposition pattern for the successive layer, even when the geometrical layer data is the same for both slices. This method may be used with both matrix and error diffusion based halftoning. An analogous result can be obtained by multiplying the layer data with scalar values smaller and larger than one respectively, instead of adding negative and positive error values.

For an error diffusion halftoning process, part of the error value generated at each element location due to the halftoning may be passed to the corresponding element and neighboring elements in the next layer. The portion of these errors would then be added to the elements of the contone data describing the object geometry for the next layer prior to halftoning those elements, just as is done for errors passed to neighboring elements in the original layer. By distributing part of the error values created during halftoning to the next layer, a different halftone data pattern will result.

Figure 6:
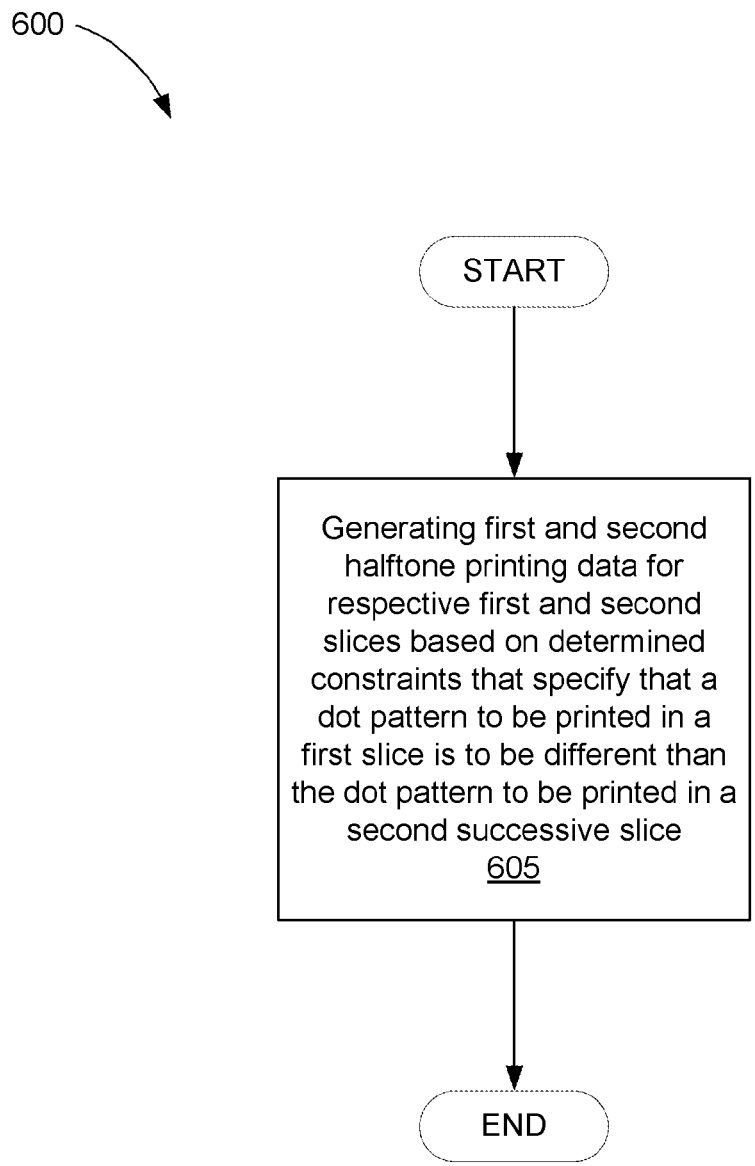
FIG. 6 is a flowchart showing a method of non-deterministically generating halftone data for successive slices of the three-dimensional object according to another example of the principles described herein.

FIG. 6 is a flowchart showing a method (600) of non-deterministically generating halftone data for successive slices of the three-dimensional object according to another example of the principles described herein. The method (600) may begin with generating (605) first and second halftone data for respective first and second slices based on determined constraints that specify that a dot pattern to be used for the first slice is to be different than the pattern to be used for the second slice. In this example, the first and second halftone data are different from each other such that flaws in the three-dimensional object do not aggregate.

In one example, a cost weighting algorithm may be used to generate a number of different threshold matrices. A cost weighting algorithm evaluates multiple solutions to a problem, and calculates the "cost" of each solution based on specified rules. The solution with the lowest cost is selected as the output of the algorithm. In this example, one of the costing rules would place a high cost on a matrix value likely to deposit fluid in the same location as the previous matrix. Other costing rules may be used to generate a desired texture within each halftone matrix and allow the matrix to be tiled or wrapped without creating defects or textures along its edges, among other considerations.

In the present specification, however, any algorithm may be used such that the generated threshold matrices produced are different. In this example, the processor (FIG. 1, 105; FIG. 2, 210) may look at the threshold matrix created for a first slice of the three-dimensional object and compare a second generated threshold matrix for a second successive slice of the model data. If, for example, the difference between a threshold in one voxel (a value on a regular grid in three-dimensional space) location of the first threshold matrix is sufficiently different than a threshold in the same voxel location for a second threshold matrix, then the first and second halftone data generated by the first and second threshold matrices, respectively, will be sufficiently different. The sufficiency of the differences between any given voxel location in any given threshold matrix may also be controlled through the use of a similarity threshold chosen previous to the threshold matrix generation.

In the example of the method (600), the differently generated threshold matrices may be used in a number of ways. In one example, a new threshold matrix may be created for each slice of the three-dimensional object that is defined by the same contone data. In another example, a number of threshold matrices may be created and applied to the contone data describing each of the same slices of the three-dimensional object in a random fashion. In yet another example, a number of threshold matrices may be created and applied to the contone data describing each of the same slices of the three-dimensional object in a pattern. In still another example, a number of threshold matrices may be created and applied to the contone data describing each of the slices of the three-dimensional object such that no threshold matrix is used again in an immediately successive slice.

Figure 7:
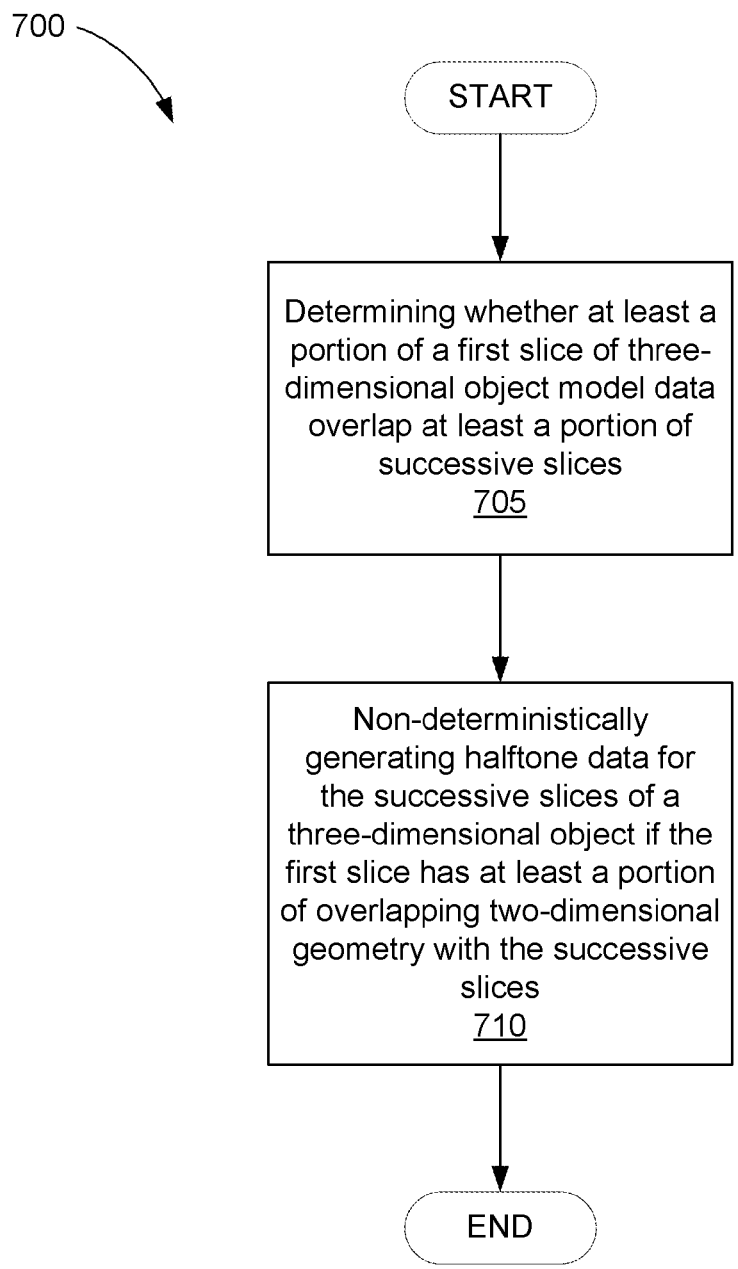
FIG. 7 is a flowchart showing a method of generating a three-dimensional object according to another example of the principles described herein.

FIG. 7 is a flowchart showing a method (700) of generating a three-dimensional object according to another example of the principles described herein. The method (700) may begin by determining (705) whether at least a portion of a first slice of three-dimensional object model data overlap at least a portion of successive slices. Where no portions of a number of slices of three-dimensional object model data overlaps, the additive manufacturing device may deterministically generate halftone data for these portions of the slices. However, the method (700) may continue by non-deterministically generating (710) halftone data for the portions of the successive slices of a three-dimensional object if the first slice overlaps with the successive slices. In this method (700) those slices of the three dimensional object data that do not have overlapping portions are not subjected to one of the methods described in FIGS. 4-6 and a deterministic halftoning process is conducted for those slices. This may cause the additive manufacturing device to quickly process those portions of those slices that are not overlapping while focusing processing power on those portions of slices that are to be subjected to a non-deterministic halftoning process described herein.

Aspects of the present systems (100, 200) and methods (300, 400, 500, 600) are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 1, 105; FIG. 2, 210) of the additive manufacturing device (FIG. 1, 100; FIG. 2, 205) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

In one example, the computer program product mentioned above may comprise a computer readable storage medium comprising computer usable program code embodied therewith, the computer usable program code comprising computer usable program code to, when executed by a processor (FIG. 1, 105; FIG. 2, 210), non-deterministically generate halftone data for portions of a slice of three-dimensional model data that overlaps a previous slice. Additionally, the computer usable program code may comprise computer usable program code to, when executed by a processor (FIG. 1, 105; FIG. 2, 210), use a randomized initialization position for a halftone matrix for each slice of a three-dimensional object. Further, the computer usable program code may comprise computer usable program code to, when executed by a processor (FIG. 1, 105; FIG. 2, 210), generate error data after generating first halftone data for a first slice of the successive slices and mathematically associate the error data with continuous tone values when generating second halftone data for a second slice successive to the first slice. Still further, the computer usable program code may comprise computer usable program code to, when executed by a processor (FIG. 1, 105; FIG. 2, 210), generate first and second halftone data for respective first and second slices based on determined constraints that specify that a material-deposition pattern to be used in the first slice is to be different than the material-deposition pattern to be used in the second slice.

The specification and figures describe the generation of a three-dimensional object by generating halftone data for generating a three-dimensional object. The generation of the object comprises generating non-deterministic halftone data for successive slices of the three-dimensional model data. The generation of this non-deterministic halftone data may have a number of advantages, including preventing errors presented in generated halftone data from being repeated throughout multiple layers of a three-dimensional object, thereby helping prevent the three-dimensional object from having visual or structural defects therein resulting from repetitive halftone patterns. Additionally, non-deterministic halftone patterning throughout the multiple layers of the object generates more consistent three-dimensional spacing between drops deposited to form the object that, in turn, improves the homogeneity of the object being built with the additive manufacturing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of forming a three-dimensional object comprising:

non-deterministically generating halftone data for portions of a slice of three-dimensional model data of the three-dimensional object that overlap with a previous slice;
wherein non-deterministically generating halftone data comprises implementing randomized initialization for each slice of a three-dimensional object by shifting a start position of halftone matrix data used to form each slice of the three-dimensional object using a nonintegral multiple of a size of the matrix data.

2. The method of claim 1, in which non-deterministically generating halftone data comprises preloading a number of errors in an error diffusion halftoner.

3. The method of claim 1, in which the halftone data for each successive slice is generated by:
generating error data after generating first halftone data for a first slice of successive slices; and
mathematically associating the error data with continuous tone values when generating second halftone data for a second slice to be placed on the first slice.

4. The method of claim 1, further comprising generating first and second halftone data sets for respective first and second slices of the object based on determined constraints that specify that a first pattern for the first slice be different than a second pattern for the second slice.

5. The method of claim 4, in which, for each slice of the three-dimensional object, a different halftone matrix is selected.

6. An additive manufacturing device, comprising:
a processor; and
a memory communicatively coupled to the processor;
wherein the processor non-deterministically generates halftone data for each of a number of successive slices of three-dimensional model data for a three-dimensional object when at least a portion of each of the successive slices overlap with a previous slice;
wherein non-deterministically generating halftone data comprises implementing randomized initialization for each of the slices of the three-dimensional object by shifting a start position of halftone matrix data used to form each slice of the three-dimensional object using a nonintegral multiple of a size of the matrix data.

7. The additive manufacturing device of claim 6, in which the randomized initialization data is different for adjacent slices throughout the entire three-dimensional object.

8. The additive manufacturing device of claim 6, in which the randomized initialization data comprises data describes a starting position of a matrix halftone at a different location for each slice of the three-dimensional object.

9. The additive manufacturing device of claim 6, in which the halftone data for each successive slice is generated by:
generating error data when generating first halftone data for a first slice; and
mathematically associating the error data with continuous tone values when generating second halftone data for a second slice to be formed on the first slice.

10. The additive manufacturing device of claim 6, in which the halftone data for each successive slice is generated by:
generating an error value at each element location in a contone matrix when generating first halftone data for a first slice; and
passing part of the error value to a corresponding element in a successive slice.

11. A method, comprising:
with a processor of an additive manufacturing device:
determining whether at least a portion of a first slice of three-dimensional object model data overlap at least a portion of a successive slice; and
non-deterministically generating halftone data for a portion of the successive slice of three-dimensional model data defining the three-dimensional object if the first slice overlaps the successive slice;
wherein non-deterministically generating halftone data comprises implementing randomized initialization for each of the successive slices of the three-dimensional object by shifting a start position of halftone matrix data used to form each successive slice of the three-dimensional object using a nonintegral multiple of a size of the matrix data.

12. The method of claim 11, in which in the halftone data for each of the successive slices is generated by:
generating error data when generating first halftone data for the first slice; and
mathematically associating the error data with continuous tone values when generating second halftone data for the successive slice.

13. The method of claim 11, in which non-deterministically generating halftone data comprises preloading a number of errors in an error diffusion halftoner.

14. The method of claim 11, comprising generating first and second halftone data sets for respective first and second slices of the three-dimensional object based on determined constraints that specify that a first pattern for the first slice be different than a second pattern for the second slice.

15. The method of claim 14, in which, for each slice of the three-dimensional object, a different halftone matrix is selected.

* * * * *